(12) United States Patent
Zdanky (10) Patent No.: US 9,875,662 B2
(45) Date of Patent: Jan. 23, 2018

(54) SHOPPING ASSISTING APPARATUS

(71) Applicant: Tarryl Susan Zdanky, Naperville, IL (US)

(72) Inventor: Tarryl Susan Zdanky, Naperville, IL (US)

(73) Assignee: Tarryl Susan Zdanky, Naperville, IL (US)

( * ) Notice: Subject to any disclaimer, the term of this patent is extended or adjusted under 35 U.S.C. 154(b) by 480 days.

(21) Appl. No.: 14/548,266

(22) Filed: Nov. 19, 2014

(65) Prior Publication Data

US 2015/0140521 A1  May 21, 2015

Related U.S. Application Data

(60) Provisional application No. 61/906,156, filed on Nov. 19, 2013.

(51) Int. Cl.
| | |
|---|---|
| *G09B 19/18* | (2006.01) |
| *G09B 1/06* | (2006.01) |
| *G09F 3/00* | (2006.01) |
| *G09F 23/00* | (2006.01) |
| *G09B 19/00* | (2006.01) |
| *G09B 17/00* | (2006.01) |

(52) U.S. Cl.
CPC ............... *G09B 1/06* (2013.01); *G09B 17/00* (2013.01); *G09B 19/00* (2013.01); *G09B 19/18* (2013.01); *G09F 3/00* (2013.01); *G09F 23/00* (2013.01)

(58) Field of Classification Search
USPC .......................................................... 434/30
See application file for complete search history.

(56) References Cited

U.S. PATENT DOCUMENTS 5,826,714 A * 10/1998 Martin ..................... A45C 3/00
150/106

* cited by examiner

*Primary Examiner* — Kesha Frisby
(74) *Attorney, Agent, or Firm* — IP Patent Clinic, The John Marshall Law School (57) ABSTRACT

An apparatus comprises a bag used for individuals with special needs (children and adults) and for typically developing children. The bag is used as a shopping list and schedules for what may happen on other community events to help with an easier transition on these activities for anyone that may need assistance. The inside of the bag contains storage for cards holding many product pieces. The front of the bag holds a small shopping list for those with decreased cognitive abilities. The inside of the bag may have additional hook sew-on fastener tape to provide for a longer shopping list for those with high cognitive abilities. The back of the bag has a large pocket holding product pieces once the user finds a product on their shopping list. The small pocket with flap is used to hold money, gift cards, credit cards, etc.

19 Claims, 8 Drawing Sheets

FIG. 6

SHOPPING ASSISTING APPARATUS

CROSS-REFERENCE OF RELATED APPLICATION

This is a non-provisional application of provisional application Ser. 61/906,156, filed on Nov. 19, 2013, whose entire content is incorporated by reference.

FIELD OF THE INVENTION

The present invention generally relates to a shopping bag apparatus used for individuals with special needs (children and adults) and for typically developing children.

BACKGROUND

There have been many designs of shopping assistance apparatus to train individuals with special needs and for developing children to use during routine activities. These designs, mostly books, provide removable and interchangeable articles to teach children language skilled by associating various objects with one another. However, there still remains a need for entertaining and training apparatus as helpful tools for any young child or children with special needs to complete a task more independently and learn vocabulary more efficiently. Since there may be overstimulation of lights, sounds, smells and colors may be distracting, this makes it difficult for many to have an enjoyable trip to the store and to other community services.

SUMMARY

The present invention is directed to a shopping assistance apparatus for entertaining and training individuals with special needs and for developing children to use during routine activities. The bag is designed to help individuals follow the natural pattern of learning from matching, to seeing the word that goes with the item, to reading comprehension.

DETAILED DESCRIPTION

Figure 1:
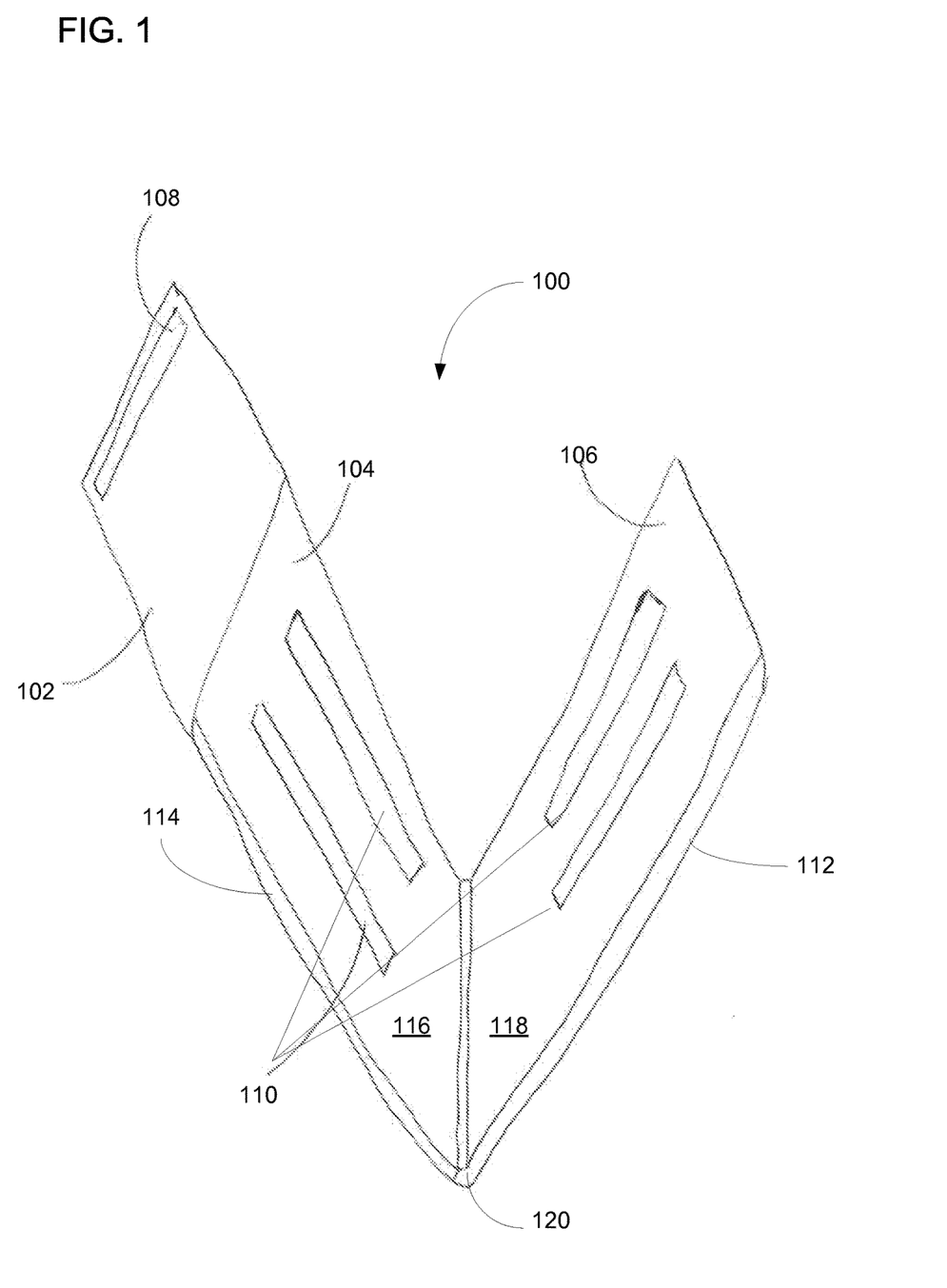
FIG. 1 is a perspective view of a bag according to one embodiment of the invention.

Referring now to FIG. 1, a perspective view of an apparatus 100 according to one embodiment of the invention is shown. In one example, the apparatus 100 is an unconventional bag. In one example, the apparatus 100 includes a flap 102, a first member 104, and a second member 106. The flap 102 being an extension of the first member 104, as illustrated in FIG. 1, includes an attachment device 108, such as a strip of Velcro®, an adhesive device, a hook sew-on fastener tape, or other device that is able to the flap 102 to engage with or adhere to a second exterior surface 112 of the second member 106. In this example, a female or receiving device (not shown in FIG. 1, but shown in subsequent figures) may receive the attachment device 108. In another example, the flap 102 may be an extension to the second member 106. Hence, in this example, the attachment device 108 enables the flap 102 to engage with or adhere to a first exterior surface 114 of the first member 104. Therefore, it is to be understood that the flap 102 may be positioned as an extension interchangeably between the first member 104 and the second member 106, as long as the female or receiving device is correspondingly positioned.

In another embodiment, the apparatus 100 may be made of a number of materials, such as fabric, plastics or leather. As such, a number of materials may be used without departing from the spirit or the scope of the invention.

The first member 104 includes a first interior surface 116 and the second member 106 includes a second interior surface 118. The first interior surface 116 and the second interior surface 118 each includes one or more attachment devices 110. These attachment devices 110 are positioned, as shown in FIG. 1, along the length of the apparatus 100 to receive or attach one or more object indicia, to be described more below. It is to be understood that the attachment devices 110 may be positioned horizontally, or along the width of the apparatus 100. It is to be understood that the different positioning of the attachment devices 110 other than those shown in FIG. 1 does not deviate from the spirit or scope of the invention. The first member 104 and the second member 106 are joined or folded toward each other at a joint 120. In one embodiment, the first member 104 and the second member 106 may be an integrated construction. In another embodiment, the first member 104 and the second member 106 may be two-piece constructions that are joined together at the joint 120 through stitching or other means to join the first member 104 and the second member 106.

Figure 2A:
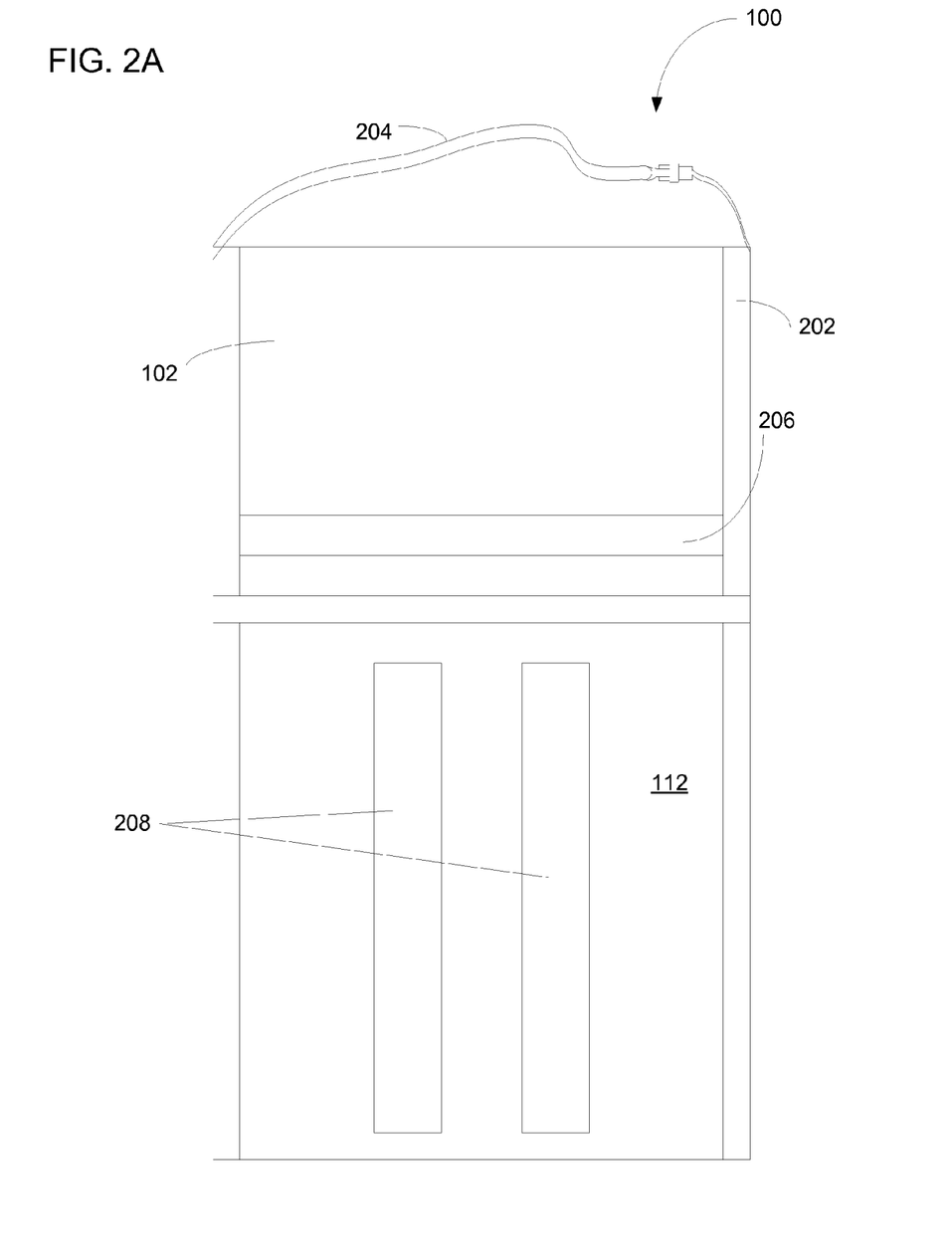
FIGS. 2A, 2B, and 2C are illustrations of a front view of an exterior surface of a bag according to one embodiment of the invention.
Figure 2B:
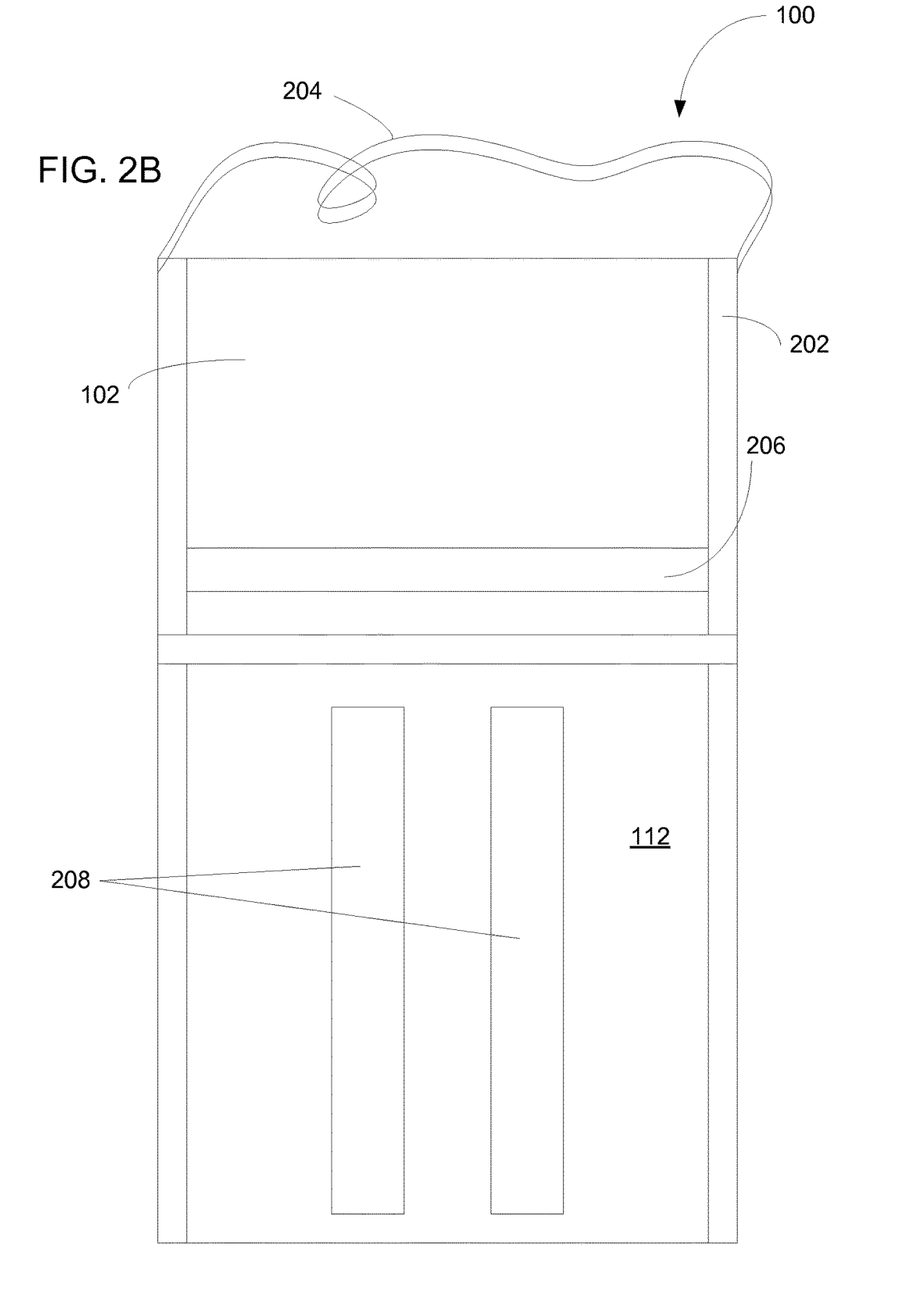
Figure 2C:
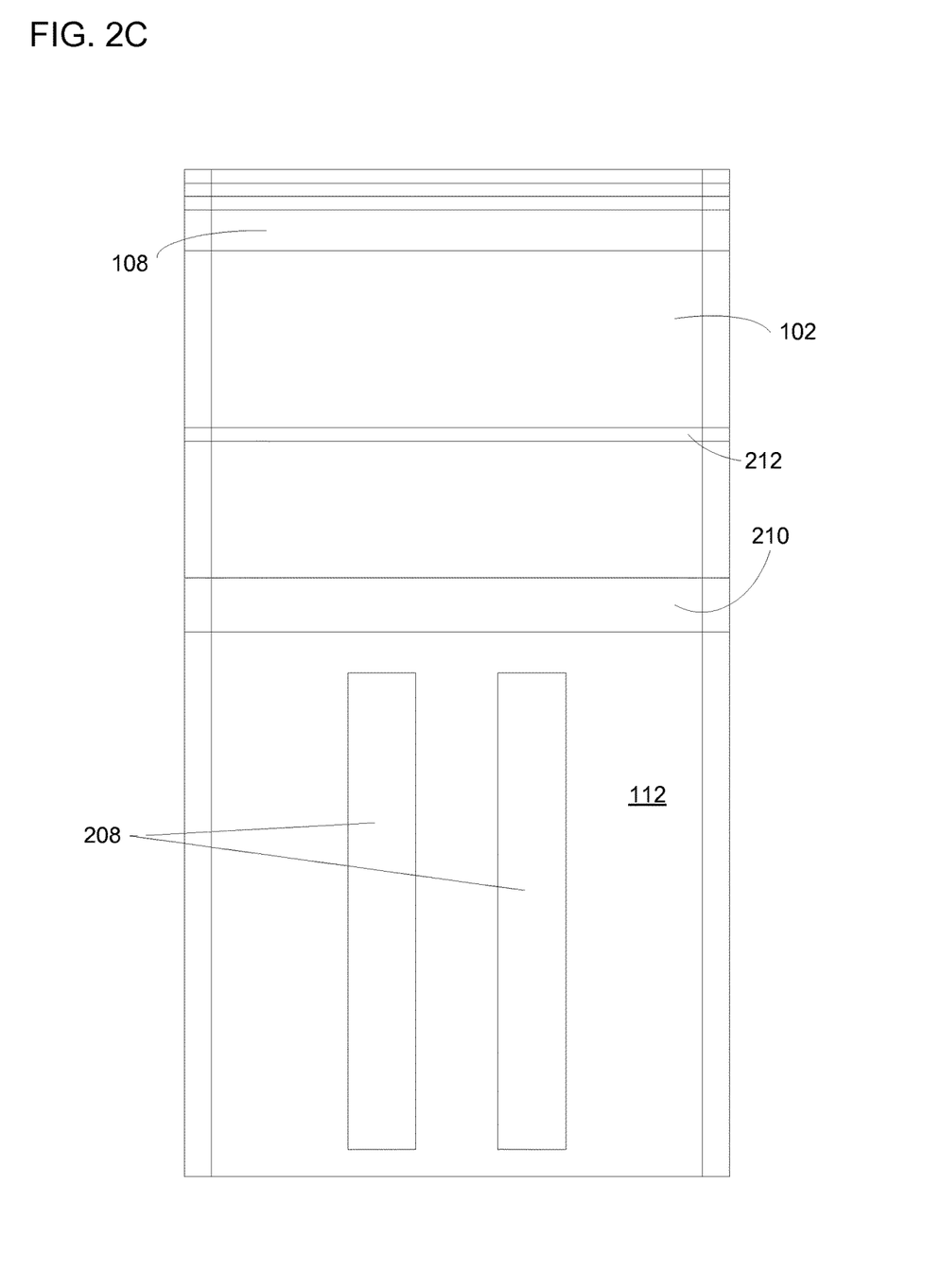

Referring now to FIGS. 2A, 2B and 2C, FIG. 2A is a front view of an exterior surface of a bag according to one embodiment of the invention. In one example, the exterior surface may be the second exterior surface 112. In this illustration, FIG. 2A shows an outer surface 202 of the flap 102. As the flap 102 is an extension of the first member 104 and having the flap 102 reaching and partially covering the second exterior surface 112, the flap 102 holds the first member 104 and the second member 106 together. As such, FIGS. 2A and 2B illustrate the flap 102 being in a closed position. As such, it is to be understood that on the second exterior surface 112, a receiving attachment device is positioned to match correspondingly with the attachment device 108 on the flap 102.

In this example, the surface 202 includes a strip 206 that may be decorative or reflective for a number of purposes. In another embodiment, the surface 202 may not include such strip 206.

Still referring to FIG. 2A, the apparatus 100 further includes a strap 204, which may be a hook fastener tape or a typical clip-on strap. In this embodiment, the strap 204 is adjustable. In another embodiment, as shown in FIG. 2B, the strap 204 may not be adjustable.

Still referring to FIG. 2A, the second exterior surface 112 includes one or more attachment devices 208. In one example, the attachment devices 208 are similar to that of the attachment devices 110. Again, the placement or orientation of the attachment devices 208 does not need to be along the length of the second exterior surface 112 as shown in FIG. 2A or FIG. 2B.

In another embodiment, FIG. 2C illustrates the flap 102 being opened. In this example, the flap 102 with the attachment device 108 being foldable at 212 such that the attachment 108 mates or matches with an attachment device 210 on the second exterior surface 112.

Figure 3:
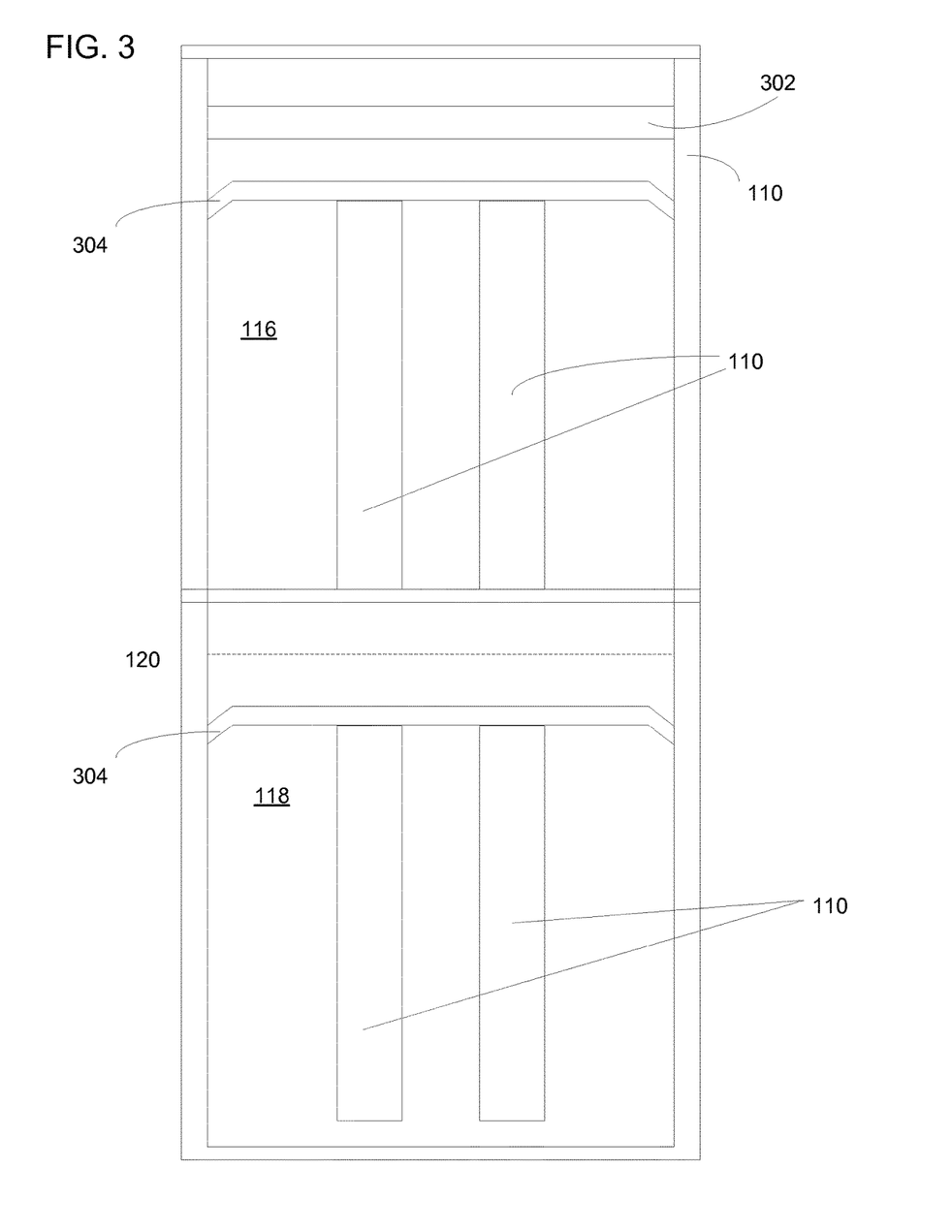
FIG. 3 is an illustration of an interior side of a bag according to one embodiment of the invention.

Referring now to FIG. 3, a frontal view of the interior surfaces of the apparatus 100 according to one embodiment of the invention. In one embodiment, as shown in FIG. 1, the first interior surface 116 and the second interior surface 118 each includes a number of attachment devices 110. In one example, the attachment devices may be Velcro® strips, adhesive tapes, or the like. In another example, the apparatus 100 includes a strip 302 for reflexive materials or for providing space for texts or other display objects. In another embodiment, the apparatus 100 may further include a decorative or other element or object, such as an element 304, in the interior surfaces, such as the first interior surface 116 or the second interior surface 118.

Figure 4:
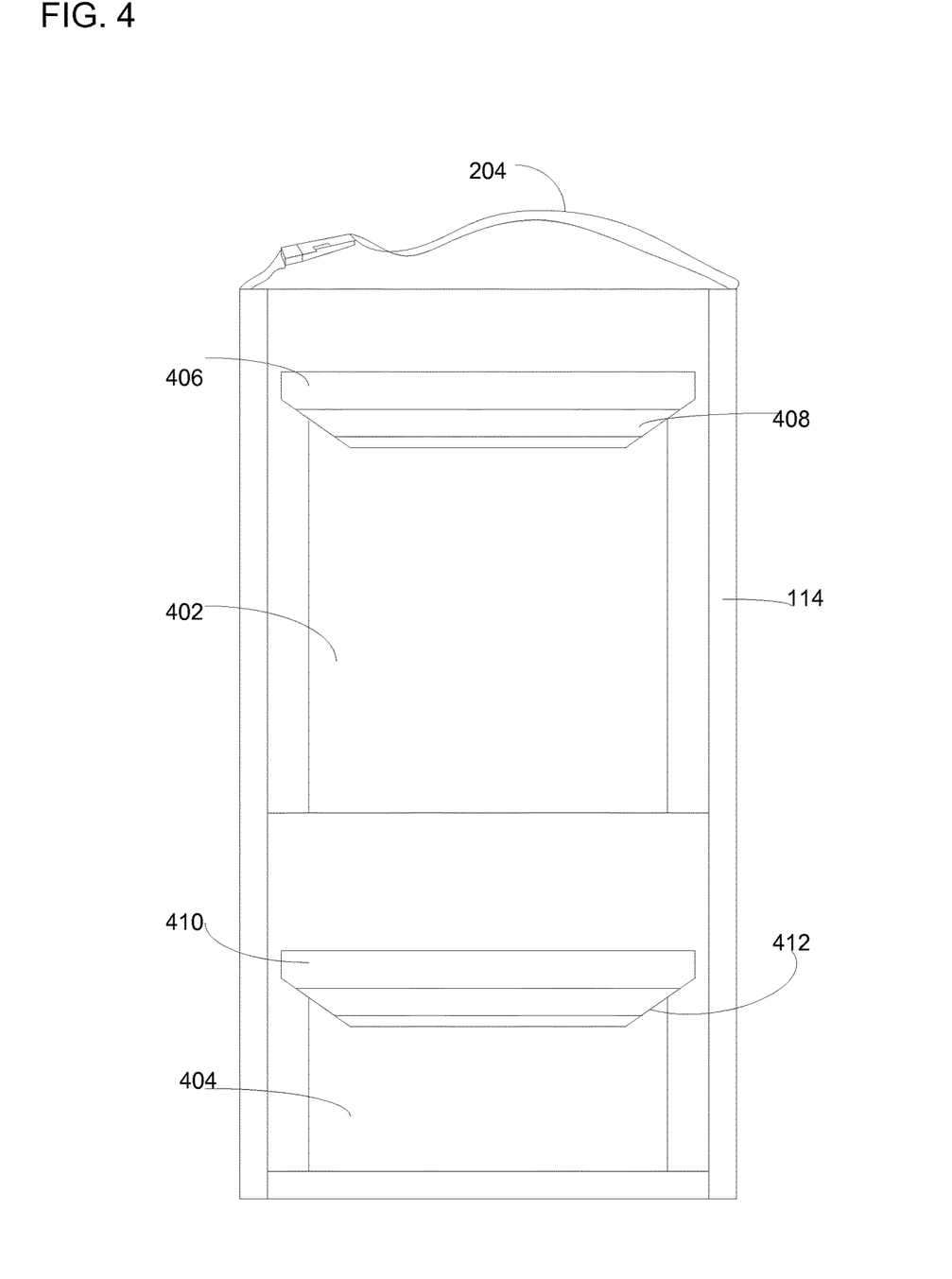
FIG. 4 is an illustration of a front view of another exterior surface of a bag according to one embodiment of the invention.
Figure 5:
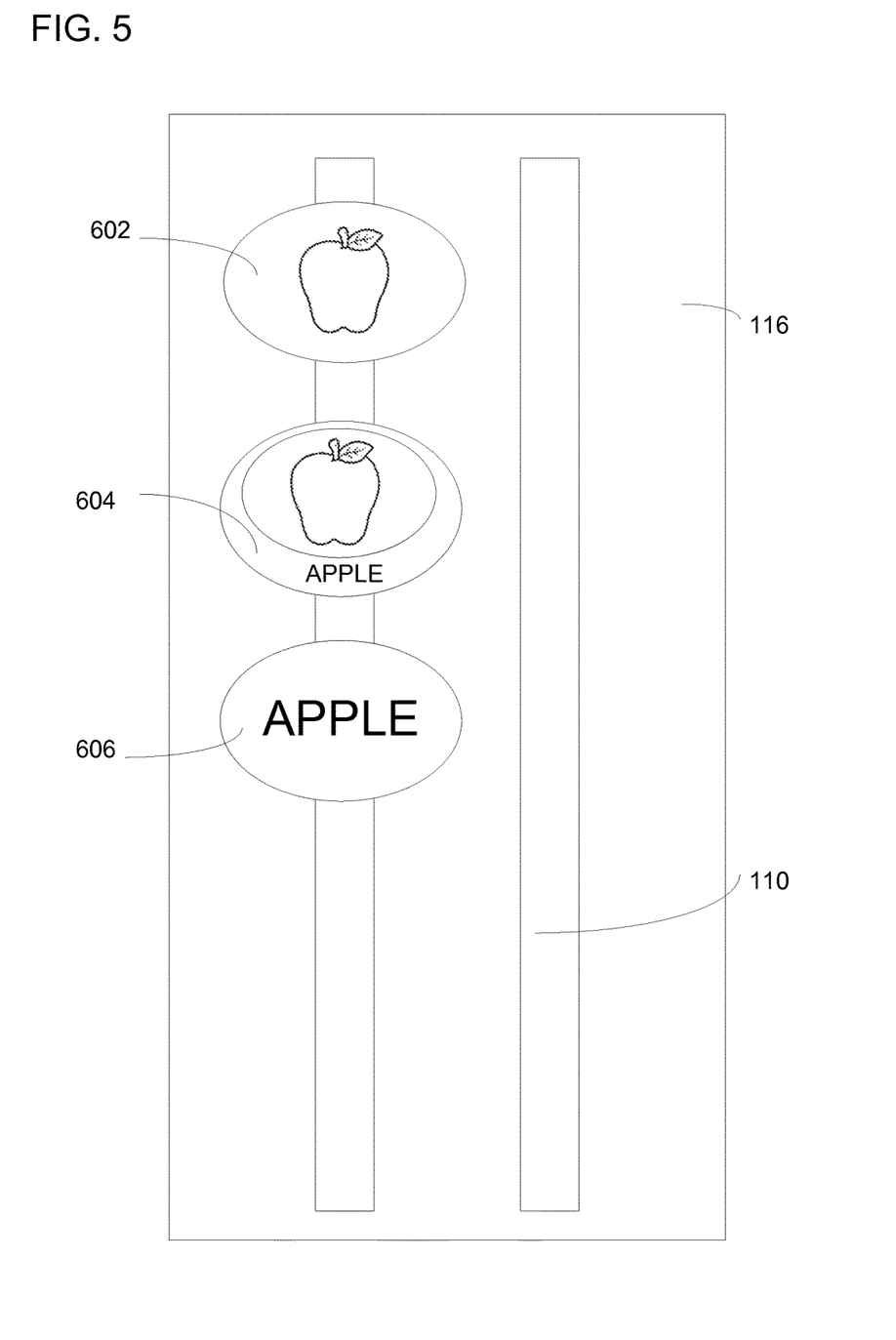
FIG. 5 is an illustration of a front view of an interior side of a bag with object indicia thereon according to one embodiment of the invention.

Referring to FIG. 4, a frontal view of the exterior surface of the apparatus 100, such as the first exterior surface 114. In this example, the first exterior surface 114 includes one or more pockets, such as a first pocket 402 and a second pocket 404. In one example, the first pocket 402 and the second pocket 404 include space for receiving objects, such as object indicia. In another example, the first pocket 402 and the second pocket 404 may receive objects, such as money, a credit card, coins, etc. It is to be understood that the first pocket 402 and the second pocket 404 may be suitable to receive a number of items other than those described above without departing from the spirit or the scope of the invention.

In another embodiment, the first pocket 402 includes a flap 406 and a flap lip 408. In one embodiment, an attachment device (not shown) is disposed under the flap lip 408 so as to securely adhere or attach the flap 406 on the first pocket 402. Similarly, the second pocket 404 includes a flap 410 and a flap lip 412. In one embodiment, an attachment device (not shown) is disposed under the flap lip 412 so as to securely adhere or attach the flap 410 on the first pocket 404.

Figure 6:
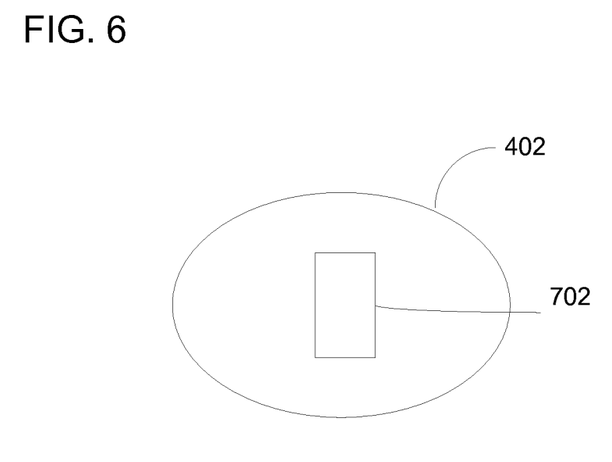
FIG. 6 is an illustration of a back of an object indicia according to one embodiment of the invention.

Referring now to FIG. 6, a frontal view of a partial interior surface, such as the first interior surface 116 according to one embodiment of the invention. In this embodiment, one or more object indicia, 602, 604 and 606 are attached to the attachment device 110. As illustrated, the object indicia 602 illustrate a graphical representation of an object. In this case, the object indicia 602 illustrate an image or a photograph of an apple. In another embodiment, the object indicia 604 illustrate a combination of a graphical representation of an object and a text or title of the object depicted. In this example, the object indicia 604 show both an image/a photograph of an apple and the word "apple". Further, the object indicia 606 illustrate a text with the name of the object or a concept. In this example, the object indicia 606 show the name "apple" without any graphical representation. It is to be understood that a combination of the indicia 602, 604 and 606 may be used. It is further appreciated that different sizes of the indicia 602, 604 and 606 may be used. In addition, other types of indicia, such as representations of money, such as the money sign, dollar sign, may be used. In addition, the object indicia may represent numbers, feelings, etc.

FIG. 6 illustrates a back view of the object indicia according to one embodiment of the invention. In one embodiment, the object indicia may be the object indicia 402. An attachment device 702 is disposed at the back of the object indicia 402. The attachment device 702 may be a Velcro®, an adhesive tape or other devices to attach to the attachment device 110. If the attachment device 110 is a Velcro® strip, it is to be understood that the attachment device 702 may also be another Velcro® strip.

In one embodiment, the apparatus or bag 100 may be rectangular in shape, such as 33" in length and 7½" in width, with binding tape 1 securing all of the outer edges. In one embodiment, the bag and the durable boards may have rounded edges. As shown in FIGS. 2A-2C, the attachment devices 208 may be two vertical strips of hook sewed-on fastener tape about 2 two inches from the left and right sides of the bag 100. The hook sewed-on fastener tape may begin four inches down from the top of the bag 100. Above the hook sewed-on fastener tape is a top flap 102 which is about 3.5 inches vertical and about 7.5 inches horizontal. There is decorative ribbon 4 at the bottom of the flap 102. A strap 204 is attached to the binding at the top of the bag 100. A side release buckle of the strap 204 may be attached to the right side of the strap. The purpose of the buckle is to attach to the strap of the shopping cart in a store.

On the opposite side of the flap 102 may a loop sewed-on fastener tape, e.g., attachment device 108, which extends horizontal the width of the bag 100. There are two large pockets in FIG. 4 at the center of the bag 100, in one example. Each pocket may be 7.5 inches in width and the outer pocket fabric may be about 9 inches in width. The pockets may allow for a storage pocket for product piece storage boards (not shown). When the strap of the bag is attached to the shopping cart handle, the interior surfaces e.g., the first interior surface 116 and the second interior surfaces 118 of the bag may be opened. In this example, the inside may reveal the shoppers' large shopping list that is attached to the attachment devices 110.

In another example, the apparatus 100 includes one large pocket 402 with flap 406 and one small pocket 404 with flap 410. The top large pocket 402 may be about 7 inches by 7.5 inches, with the outer horizontal pocket measuring about 9 inches in length. In one embodiment, the large pocket may include a pocket flap 106, having a size of about 1.5 inches in length. This pocket may be labeled "I did it!" with a drawing of a hand with the thumb up. This pocket, in one example, may be used to put the product pieces into once the grocery product on the list has been found. The small pocket 404 may be about 4 inches by 7.5 inches. It may include a pocket flap 410 of about 1.5 inches in length. In one example, this small pocket 404 may be used for shopping supplies such as dollar bills, credit cards, gift cards, wipe off markers, etc. To close the bag, the horizontal loop sewed-on fastener tape 108 may connect to the horizontal hook sewed-on fastener tape 210, as an example in FIG. 2C.

In one embodiment, a collection of object indicia may be all placed on a board with two strips of attachment devices matching those of the attachment devices 110 going down approximately the length of the board. The boards fit into the inside of the bag. There are three types of oval product pieces, such as those in objection indicia 402, 404, and 406. The first oval may be a photograph only. In this example, the first oval may be for the beginning shopper or those with cognitive challenges. This allows the shopper to use a matching skill to find the item in the store. The second oval is a photograph with the word to help the shopper get familiar with the word that goes along with the particular grocery item. The third oval may be of the word only, the background color being the same as the grocery item in most cases for a helpful hint for those individuals that are mastering their reading skills. This may create confidence, sense of accomplishment, and independence while learning to read. In another example, the bag is designed to help individuals follow the natural pattern of learning from matching, to seeing the word that goes with the item, to reading comprehension.

Again, as shown in FIG. 6, each of the object indicia may be a small piece of attachment device, such as a loop adhesive fastener tape. This allows, for example, all of the ovals to be attached to the storage boards and shopping lists located on the front of the bag 100 and on the inside of the bag. There are also large cards that may help the shopper pay for their purchase. The cards may include pictures of coins and bills. The assistant may circle the coins or bills needed with a wipe off marker. The assistant may also write the total amount of each coin or bill needed or how many of a particular type of coin or bill using a wipe off marker. The front of the bag is to be used for a short shopping list for those individuals just learning to shop or needing the most assistance. The bag may lay across the top front portion of the shopping cart for those pushing the cart. The bag may be held by the youngest shopper sitting in the top front portion of the cart. When opening the bag to the inside, the four long attachment devices, such as hook sewed-on fastener strips, may be used for a long shopping list which may be attached by the handle of the bag to the handle of the cart.

The user may choose object indicia from the storage pockets, pull off the product pieces that he/she may be shopping for, put the product pieces onto either the first exterior surface 114 of the bag which is the shorter shopping list or open the bag to the first interior surface 116 and the second interior surface 118, which represents the longer shopping list. The user may prepare the shopping list at home or in the car before entering the store. The user may attach the bag to the cart or lay the bag across the top front portion of the cart, or hold the bag with the front facing the user. During the shopping trip, once the user finds an item on their list, he/her may put the product piece into the "I did it" pocket. The user may shop for another item on their list until the entire list is in the large pocket on the back of the bag. When the user proceeds to checkout, he or she may use the coin and dollar cards to help get the correct cash amount to pay for the purchase.

The user may make progress according to followings, as an illustration: the user may start using ovals with photographs only on several shopping trips. Once the parent or assistant feels it is time for the user to try shopping with ovals with photographs and words, the parent or the assistant may put a few of those on the list along with the oval with photographs only. Then on a future shopping trip, the user would use all ovals with photographs and words on his or her list. Once the user is familiar with those ovals on the list, the assistant would put a few ovals with words only onto the shopping list. When the shopper is ready, his or her list may consist of all ovals with words only.

In one embodiment, an apparatus uses object indicia to train individuals with special needs and for developing children includes a body, said body including a first member and a second member. The first member includes a first interior surface and a first exterior surface. The second member includes a second interior surface and a second exterior surface. The first member and the second member are connected at a joint of the body. A flap is attached to the first member extending a length thereof, said flap including an attachment device on an interior surface thereof. The second exterior surface includes a corresponding attachment device for matching to the attachment device of the flap. A plurality of object indicia is included and the first interior surface, the second interior surface and second exterior surface include one or more additional attachment devices for attaching the plurality of object indicia, said object indicia being outwardly visible such that an object or content represented by the plurality of object indicia is readily visible. The first exterior surface includes a first pocket with a flap for holding the plurality of object indicia and a second pocket to receiving other objects.

A bag applies object indicia to train individuals with special needs and for developing children includes a body, said body including a first member and a second member. The first member includes a first interior surface and a first exterior surface. The second member includes a second interior surface and a second exterior surface. The first member and the second member are connected at a joint of the body. A flap is attached to the first member extending a length thereof, said flap including an attachment device on an interior surface thereof. The second exterior surface includes a corresponding attachment device for matching to the attachment device of the flap. The bag also includes a plurality of object indicia. The first interior surface, the second interior surface and second exterior surface include one or more additional attachment devices for attaching the plurality of object indicia, said object indicia being outwardly visible such that an object or content represented by the plurality of object indicia is readily visible. The first exterior surface includes a first pocket with a flap for holding the plurality of object indicia and a second pocket to receiving other objects.

In one embodiment, the object indicia may be outwardly visible such that an object or content represented by the plurality of object indicia is readily visible when the plurality of the object indicia being positioned on the second exterior surface and when the first member and the second member being folded toward each other at the joint.

In a further embodiment, the object indicia may be outwardly visible such that an object or content represented by the plurality of object indicia is readily visible when the plurality of the object indicia being positioned on the first interior surface and the second interior surface and when the first member and the second member being unfolded at the joint.

In another aspect of the invention, the shopping list bag is for use during grocery shopping. The first exterior surface of the bag is to be used for a short shopping list, for those individuals just learning to shop or needing the most assistance. The bag may lay across the top front portion of the shopping cart for those pushing the cart. The bag may be held by the youngest shopper sitting in the top front portion of the cart. When opening the bag to the inside, the four long hook sewed-on fastener tape are used for a long shopping list. In one embodiment, the shopping list may be attached by the handle of the bag to the handle of the cart.

In another aspect of the invention, the shopping list bag further comprising a plurality of large durable boards for object card extension with two strips of hook adhesive fastener tape on both sides extending the entire length of the boards for storage of object cards and the boards fit into the two chambers within the inside portion of the bag.

In another aspect of the invention, a user may choose boards from the storage pockets, pull off the product pieces that the user may be shopping for, put the product pieces onto either the front of the bag which is the shorter shopping list or open the bag to the inside which is the longer shopping list. The user may prepare the shopping list at home or in the car before entering the store. The user may attach the bag to the cart or lay the bag across the top front portion of the cart, or hold the bag with the front facing the shopper when sitting in the small seating area in shopping cart. Once the user finds an item on the list, he or she may put the product piece into the "I did it" pocket. Then the user may shop for another item on the list until the entire list is in the large pocket on the back of the bag. When proceeding to checkout, the user may use the coin and dollar cards to help get the correct cash amount to pay for the purchase.

In another aspect of the invention, the user may make progress by using the different product pieces as following stages. The user may start using object cards with photographs only for several shopping trips. Once the parent or assistant feels it is time for the user to try shopping with an object card with photograph and word, they may put a few of those on the list along with the object card with photographs only. Then on the following shopping trip, the user would have all object cards with photographs and words on their list. Once the user is familiar with those cards on their list, there assistant would put a few cards with words only.

In another aspect of the invention, the object cards are ovals, or on any other shapes.

In a further embodiment of the invention, the bag is used for shopping lists with going to different types of stores such as the craft store or hardware store, etc. The bag may also be used for schedules for performing tasks in the home such as dishes or making the bed and schedules for what may happen on other community events such as going to a movie theater or bowling. All of the schedules are made to help with an easier transition on these activities for anyone that may need assistance or to help them complete a task more independently and learn vocabulary more efficiently.

While various preferred embodiments of the present invention have been described herein in detail, it may be appreciated that variations may be made thereto without departing from the spirit of the invention. The preferred embodiments are provided for illustration and the invention is not limited to those embodiments.

What is claimed is:

1. A training apparatus for using interchangeable object indicia to train individuals with special needs and developing children comprising:
   a foldable body, said foldable body including a first member and a second member;
   said first member including a first interior surface and a first exterior surface;
   said second member including a second interior surface and a second exterior surface;
   wherein the first member and the second member are connected at a joint of the foldable body;
   a flap attached to the first member extending a length thereof, said flap including a freely positioned attachment device on an interior surface thereof;
   wherein the second exterior surface includes a corresponding attachment device matching the freely positioned attachment device of the flap;
   a plurality of interchangeable object indicia;
   wherein said first interior surface, the second interior surface and second exterior surface include one or more additional freely positioned attachment devices for attaching the plurality of interchangeable object indicia, said interchangeable object indicia being outwardly visible such that an object or content represented by the plurality of interchangeable object indicia is readily visible; and
   wherein the first exterior surface includes a first pocket with a flap for holding the plurality of interchangeable object indicia and a second pocket for receiving other objects.

2. The apparatus according to claim 1, further comprising a side release buckle attached to a right side of the handle for engaging with a shopping cart, wherein the chamber of the front surface is exposed.

3. The apparatus according to claim 1, wherein said first interior surface, the second interior surface and second exterior surface include one or more additional freely positioned attachment devices for attaching the plurality of interchangeable object indicia, said interchangeable object indicia being outwardly visible such that an object or content represented by the plurality of interchangeable object indicia is readily visible when the plurality of the interchangeable object indicia being positioned on the second exterior surface and when the first member and the second member being folded toward each other at the joint.

4. The apparatus according to claim 1, wherein said first interior surface, the second interior surface and second exterior surface include one or more additional freely positioned attachment devices for attaching the plurality of interchangeable object indicia, said interchangeable object indicia being outwardly visible such that an object or content represented by the plurality of interchangeable object indicia is readily visible when the plurality of the interchangeable object indicia being positioned on the first interior surface and the second interior surface and when the first member and the second member being unfolded at the joint.

5. The apparatus according to claim 1, wherein the first pocket or the second pocket comprising a chamber for receiving one or more items selected from the group consisting of money, gift cards, credit cards, wipes, markers, and a thumb up label with text illustrating words of praise for completing the task.

6. The apparatus according to claim 1, further comprising a plurality of large boards for indicia extension with two strips of hook fastener tapes extending the length of the boards for storage of indicia, wherein the hook fastener tapes attach to the freely positioned attachment devices comprising one of a group of elements consisting of the first interior surface, the second interior surface, or the second exterior surface.

7. The apparatus according to claim 1, wherein the plurality of interchangeable object indicia comprises three types: a photograph only for a beginning learner or those with cognitive challenges, a combination of a photograph and texts thereon to help the learner get familiar with the word that goes along with the particular items, and the word only for those individuals that are mastering their reading skills.

8. The apparatus according to claim 1, wherein each of the plurality of interchangeable object indicia further comprises a small piece of a freely positioned attachment device disposed on the back thereof.

9. The apparatus according to claim 1, wherein the plurality of interchangeable object indicia further comprises indicia representing schedules or tasks at the home, doctor's office, dentist's office, restaurant, movie theater, bowling or other community events.

10. The apparatus according to claim 1, wherein the plurality of interchangeable object indicia comprises photos or indications of one or more of the following:
   words for coins, bills to be used at check out, yes or no cards, numbers, letters.

11. The apparatus according to claim 1, wherein each of the first member and the second member comprise a rectangular shape with 33 inches in length and 7.5 inches in width.

12. A training bag for using interchangeable object indicia to train individuals with special needs and developing children comprising:
 a foldable body, said foldable body including a first member and a second member;
 said first member including a first interior surface and a first exterior surface;
 said second member including a second interior surface and a second exterior surface;
 wherein the first member and the second member are connected at a joint of the foldable body;
 a flap attached to the first member extending a length thereof, said flap including a freely positioned attachment device on an interior surface thereof;
 wherein the second exterior surface includes a corresponding attachment device for matching to the freely positioned attachment device of the flap;
 a plurality of interchangeable object indicia;
 wherein said first interior surface, the second interior surface and second exterior surface include one or more additional freely positioned attachment devices for attaching the plurality of interchangeable object indicia, said interchangeable object indicia being outwardly visible such that an object or content represented by the plurality of interchangeable object indicia is readily visible; and
 wherein the first exterior surface including a first pocket with a flap for holding the plurality of interchangeable object indicia and a second pocket to receiving other objects.

13. The bag according to claim 12, further comprising a strap attached to the foldable body.

14. The bag according to claim 12, wherein each of the first member and the second member comprise a rectangular shape with 33 inches in length and 7.5 inches in width.

15. The bag according to claim 12, wherein the freely positioned attachment devices of the second exterior surface of the bag comprise two vertical strips of hook-loop sew-on fastener tapes about two inches from the left and right sides of the bag.

16. The bag according to claim 12, further comprising a side release buckle attached to the right side of the handle for attaching the bag to the handle of the shopping cart in the store.

17. The bag according to claim 12, further comprising a plurality of large boards for indicia extension with two strips of hook fastener tapes extending the length of the boards for storage of indicia, wherein the hook fastener tapes attach to the freely positioned attachment devices comprising one of a group of elements consisting of the first interior surface, the second interior surface, or the second exterior surface.

18. The bag according to claim 12, wherein the interchangeable object indicia comprise an oval shape or any other shapes.

19. A training bag for using interchangeable object indicia to train individuals with special needs and developing children comprising:
 a foldable body, said foldable body including a first member and a second member;
 said first member including a first interior surface and a first exterior surface;
 said second member including a second interior surface and a second exterior surface;
 wherein the first member and the second member are connected at a joint of the foldable body;
 a flap attached to the first member extending a length thereof, said flap including a freely positioned attachment device on an interior surface thereof;
 a strap attached to the foldable body;
 wherein the second exterior surface includes a corresponding attachment device for matching to the freely positioned attachment device of the flap;
 a plurality of interchangeable object indicia;
 wherein said first interior surface, the second interior surface and second exterior surface include one or more additional freely positioned attachment devices for attaching the plurality of interchangeable object indicia, said interchangeable object indicia being outwardly visible such that an object or content represented by the plurality of interchangeable object indicia is readily visible; and
 wherein the first exterior surface including a first pocket with a flap for holding the plurality of interchangeable object indicia and a second pocket to receiving other objects.

* * * * *